United States Patent [19]

Hiraguri

[11] 4,158,857
[45] Jun. 19, 1979

[54] JITTER MEASURING APPARATUS

[75] Inventor: Seisuke Hiraguri, Yokohama, Japan

[73] Assignee: Victor Company of Japan, Ltd., Yokohama, Japan

[21] Appl. No.: 880,387

[22] Filed: Feb. 23, 1978

[30] Foreign Application Priority Data

Feb. 24, 1977 [JP] Japan .................................. 52-18716

[51] Int. Cl.² .............................................. H04N 9/62
[52] U.S. Cl. ..................................... 358/139; 358/148; 324/121 R
[58] Field of Search ................... 358/139, 127, 8, 148, 358/155, 107; 360/31; 324/102, 121 R

[56] References Cited

U.S. PATENT DOCUMENTS

| 3,337,684 | 8/1967 | Sadler | 358/139 |
|---|---|---|---|
| 3,641,554 | 2/1972 | Slavin | 324/121 |
| 3,895,186 | 7/1975 | Yoshida et al. | 358/264 |
| 4,058,826 | 11/1977 | Schneider | 358/139 |

FOREIGN PATENT DOCUMENTS 2454009  5/1976  Fed. Rep. of Germany ............ 358/139

OTHER PUBLICATIONS

Glen Southworth, "A New Method of Television Wave Form Display", 9-66, Journal of the SMPTE.
Southworth, "Use Your TV Set as an Oscilloscope", pp. 66-67, 158, Apr. 1958, Radio & TV News.
Luytgaarden "Videoscope", 12-71, pp. 1234-1242 Elektor.

Primary Examiner—Robert L. Griffin
Assistant Examiner—Edward L. Coles

[57] ABSTRACT

A jitter measuring apparatus forms a circuit for detecting the jitter component found in an input signal. A jitter indicating line signal is generated in response to the detected jitter component. At least one reference line signal is generated at a time point which deviates from the jitter indicating line signal. The jitter indicating line signal is supplied to a television receiver which displays it as a line which extends vertically and sways horizontally on the picture screen. The reference line signal is supplied to the television receiver where it is displayed as a reference line extending vertically at a reference position, for the jitter indicating line on the picture screen.

8 Claims, 9 Drawing Figures

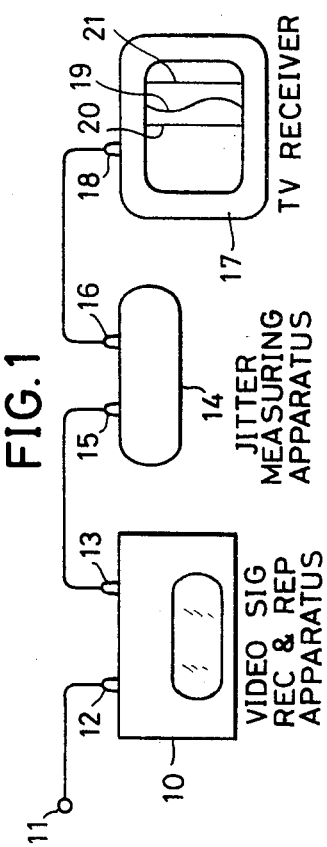
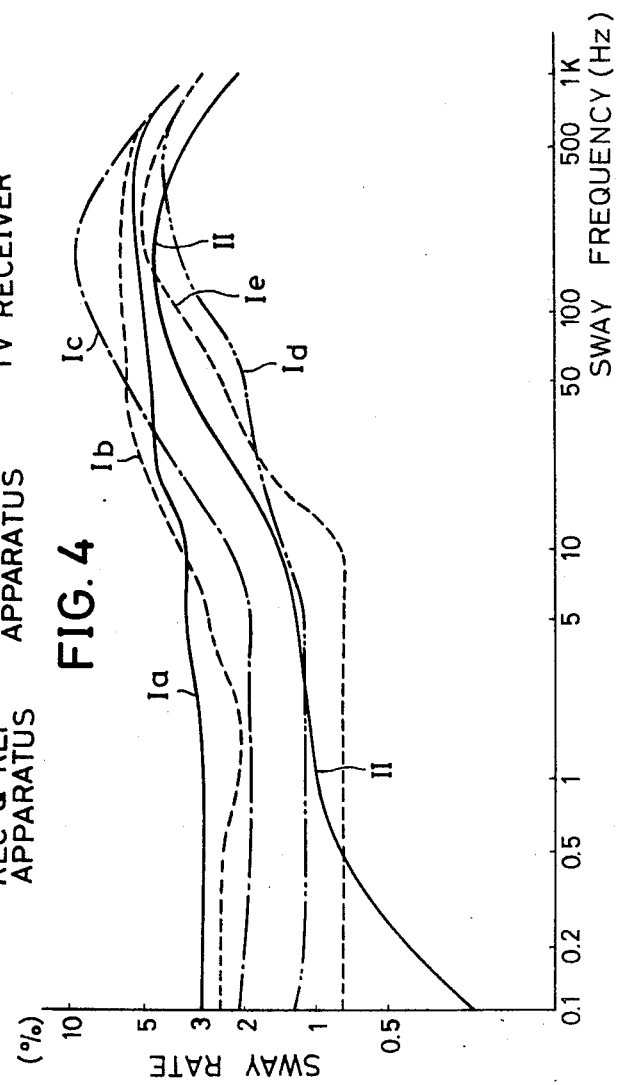

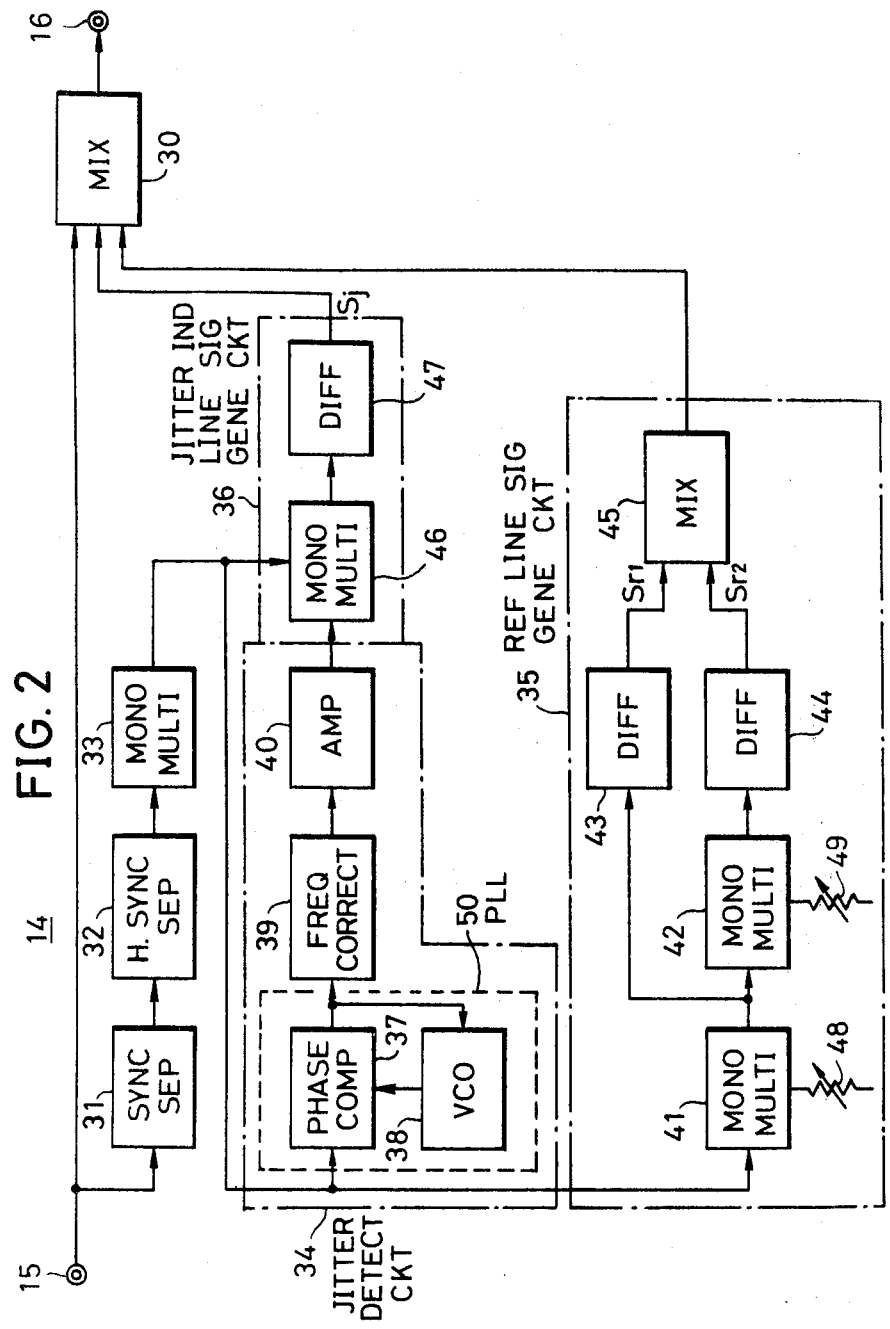

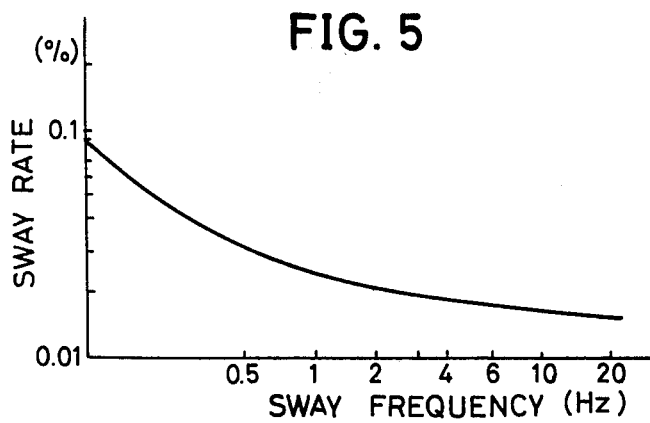
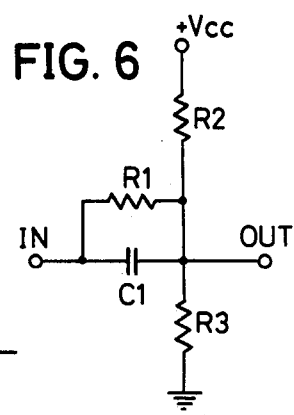
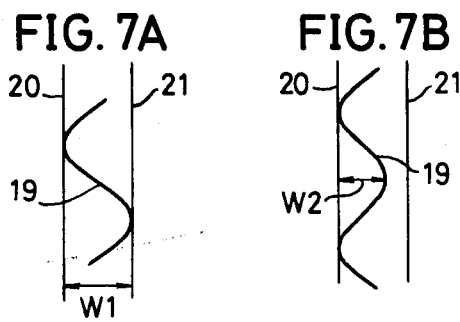
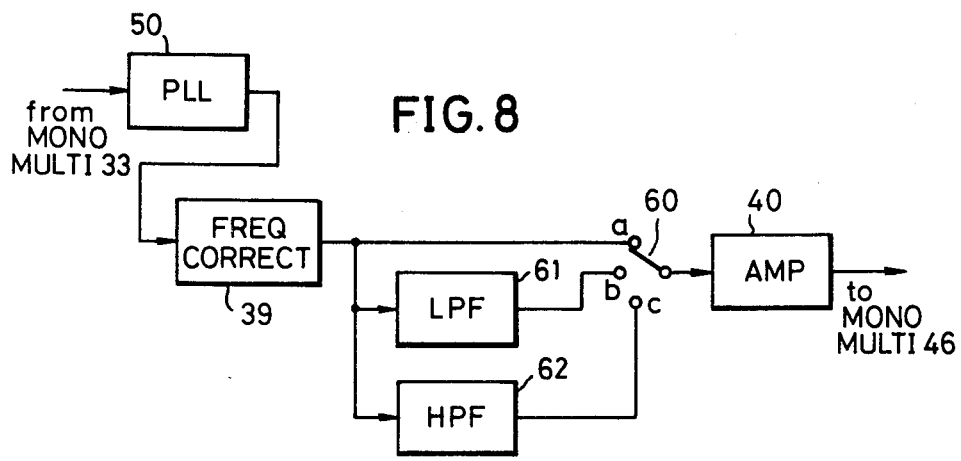

JITTER MEASURING APPARATUS

BACKGROUND OF THE INVENTION

The present invention relates generally to apparatus for measuring the jitter of a signal and more particularly to an apparatus for measuring the jitter (time-axis fluctuation component) of a video signal which is reproduced by a video signal recording and/or reproducing apparatus.

In general, video signal recording and/or reproducing apparatus have differences in quality depending on the apparatus. There are certain irregularities in the rotating heads, fluctuations of type traveling speeds, and other deviations. When such irregularities, fluctuations, and deviations exist, jitter (a time-axis fluctuation component) occurs in the reproduced video signal. When jitter is present in a reproduced signal, the image on the picture screen of the television receiver sways in the horizontal direction. In general, the jitter is represented by a time unit ($\mu$ sec.) which has been converted in correspondence to the horizontal scanning time on a picture screen of a television receiver.

It is desirable that no jitter be produced in a video signal recording/reproducing apparatus. Therefore, jitter is measured in the final inspection process during the production of a video signal recording/reproducing apparatus.

However, while it is generally true that jitter exists in a reproduced signal, usually it is of only a very small magnitude. For this reason, it is almost impossible to inspect this magnitude with accuracy merely by supplying the reproduced signal to a television receiver and observing the resulting swaying of the image on the picture screen. Moreover, the automatic frequency control (AFC) characteristic of a commercial televison receiver, in general, differs with the manufacturer and the type of receiver. Even with the same jitter, the degree of swaying in the picture image differs with the television receiver.

Accordingly, heretofore, an apparatus for measuring jitter has been one wherein the jitter content of the reproduced signal is detected. An oscilloscope, a spectrum analyzer, or a pen recorder is directly operated in response to the resulting detection output. This method of detecting the jitter content of a signal is accomplished by detecting the time-axis fluctuation component of the horizontal synchronizing signal in the reproduced video signal. However, the horizontal synchronizing signal deviates greatly at the so-called switching point. That switching occurs at the time point of switching between the output signals of the rotating heads of a video signal recording/reproducing apparatus. For this reason, the jitter measurement is greatly influenced by this switching effect, whereby accurate measurement could not heretofore be carried out.

Furthermore, unless the operator of a known jitter measuring apparatus has considerable skill in performing the measuring operation, it is difficult to interpret of the resulting measurement data. Consequently, the determination of the magnitude of the jitter is difficult.

SUMMARY OF THE INVENTION

Accordingly, it is a general object of the present invention to provide a novel and useful jitter measuring apparatus in which the above described difficulties encountered in the prior art have been overcome.

Another and more specific object of the invention is to provide a jitter measuring apparatus wherein the jitter signal on the picture screen of a television receiver is magnified and indicated by a swaying or rolling line, which oscillates sidewardly. By the use of the apparatus according to the present invention, accurate jitter measurement can be carried out without any adverse effect due to the switching point. Furthermore, the operator can very readily evaluate the measurement results.

Still another object of the invention is to provide a jitter measuring apparatus wherein jitter is indicated by a swaying line and by reference lines on opposite sides of this jitter indicating line. By setting, beforehand, the space between the two reference lines to correspond to an allowable jitter magnitude, it is easy to determine whether or not the jitter is within the allowable value. It is only necessary to determine whether the jitter indicating line lies within the space between the two reference lines or whether it deviates to a position outside of these reference lines. Furthermore, by adjusting the space between the reference lines to coincide with the maximum swaying amplitude of the line indicating jitter, the value of the jitter magnitude can be readily determined.

Other objects and further features of the present invention will be apparent from the following detailed description when read in conjunction with the accompanying drawings.

BRIEF DESCRIPTION OF THE DRAWINGS

In the drawings:

FIG. 1 is a diagram indicating the general arrangement of the jitter measuring system of the present invention;

FIG. 2 is a block diagram showing one embodiment of the jitter measuring apparatus according to the invention;

FIG. 4 is a grah indicting a weighting characteristic curve of a frequency characteristic correction circuit in the apparatus shown in FIG. 2 and an AFC (automatic frequency control) characteristic of televison receivers currently sold on the market;

FIG. 5 is a graph indicating the visual characteristic of jitter on a picture screen;

FIG. 6 is a circuit diagram of one embodiment of the frequency characteristic correction circuit in the apparatus illustrated in FIG. 2;

FIGS. 7A and 7B are display respectively illustrating a jitter indicating line and reference lines on the picture screen of a telvision receiver; and FIG. 8 is a block diagram of another embodiment of one part of the apparatus shown in FIG. 2.

DETAILED DESCRIPTION

Figure 3:
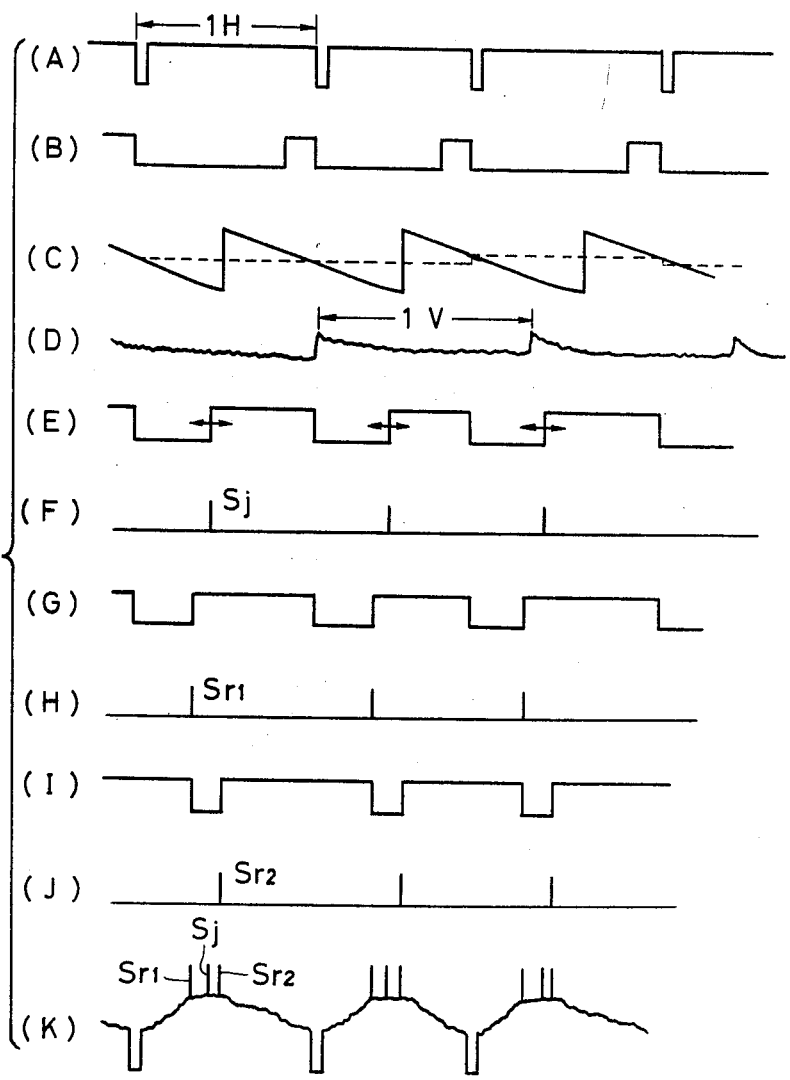
FIG. 3(A) through 3(K) are waveform diagrams respectively indicating the wave forms of signals at various parts of the apparatus shown in FIG. 2.

FIG. 1 shows the general arrangement of a jitter measuring system which employs the present invention. The jitter measurement is taken on a video signal recording and reproducing apparatus 10. The amount of jitter is measured. First, the apparatus 10 is placed in its recording mode of operation and a video signal is supplied through input terminals 11 and 12 to be recorded on a magnetic tape. Next, this same video signal recording and reproducing apparatus 10 is placed in its reproducing mode of operation thereby to reproduce the video signal. The reproduced signal is supplied through an output terminal 13 to an input terminal 15 of a jitter measuring apparatus 14 incorporating the invention described hereinafter. It is to be noted that pre-recorded tape may be reproduced. Thus, it is not necesary to both record and reproduce a video signal in the video signal recording and reproducing apparatus 10.

A video signal is supplied through an output terminal 16 to an input terminal 18 of a television receiver 17. The resulting measurement signal, which is obtained as described hereinafter is superimposed by the jitter measuring apparatus 14 upon the video signal. The input terminal 18 may be either a video input terminal or an antenna input terminal, depending on the kind (frequency band) of the reproduced video signal.

The picture screen of the television receiver 17 displays the picture image formed by the reproduced video signal. A jitter indicating line 19 extends vertically and sways horizontlly in a snaky shape to indicate the magnified jitter component. A pair of reference lines 20 and 21 extend vertically in a spaced apart relationship on opposite sides on the jitter indicating line 19. All of these signals, pictures, and lines are displayed on the same picture screen. Signals for forming the jitter indicating line 19 and the reference lines 20 and 21 are generated in the jitter measuring apparatus 14. The magnitude of the amplitude of the swaying jitter indicating line 19 represents the magnitude of the jitter, and the sway frequency corresponds to the frequency of the jitter.

In the present embodiment of the invention, the sway quantity (amplitude) of the jitter indicating line 19 has been magnified 10 times. Furthermore, the distance and space between the reference lines 20 and 21 correspond to the allowable range of jitter. (That is, the allowable range of jitter meets the specification of an inspection.) The jitter refers to that in the video signal recording and reproducing apparatus 10 being inspected. Accordingly, if the sway of the jitter indicating line 19 is within the reference lines 20 and 21, the inspection specification is met. However, if the oscillation of line 19 deviates outside of the reference lines, the inspection specification is not met. Thus, the inspection can be carried out very easily, and special skill is not required for a measuring operator.

A specific embodiment of the jitter measuring apparatus 14 will now be described with reference to the block diagram in FIG. 2. A video signal reproduced from the video signal recording and reproducing apparatus 10 is introduced through the input terminal 15 to a mixer 30 and a synchronizing signal separating circuit 31. The synchronizing signal which is separated in circuit 31 is supplied to a horizontal synchronizing signal separating circuit 32. From there, a horizontal synchronizing signal having a waveform as indicated in FIG. 3(A) is led out. Then, when a jitter content is present in there reproduced video signal, the horizontal synchronizing signal is also fluctuating on the time axis.

The separated horizontal synchronizing signal is supplied to a monostable multivibrator 33, which produces an output signal which is synchronized with the horizontal synchronizing signal, as indicated in FIG. 3(B). This output signal falls with the fall of the horizontal signal and rises after a specific time. The equalizing pulses are removed. This output signal is also supplied to a phase comparator 37 of a jitter detecting circuit 34, to a monostable multivibrator 41 of a reference line signal generating circuit 35, and to a monostble multivibrator 46 of a jitter indicating line signal generating circuit 36.

In the jitter detecting circuit 34, the phase comparator 37 and a voltage-controlled oscillator 38 constitute a phase locked loop (PLL) circuit 50. The time-axis fluctuation component of the signal from the monostable multivibrator 33 is detected by the PLL, as indicated in FIG. 3(C). The PLL output signal is indicated by a broken line in FIG. 3(C). When this detection output is indicated with one vertical scanning period as a unit, it is as indicated in FIG. 3(D). This output detection signal is supplied to a frequency characteristic correction circuit 39 described hereinafter. Circuit 39 gives the detection signal a characteristic conforming to a specific weighting curve.

The output signal of the frequency characteristic correction circuit 39 is amplified to a specific level by an amplifier 40 and is thereafter supplied to the monostable multivibrator 46. In this case, the amplification degree of the amplifier 40 determines the magnitude of the jitter displayed by the jitter indicating line 19 (i.e., the magnitude of the sway in the horizontal direction of the jitter indicating line 19). In the present embodiment of the invention, this amplification degree is so selected that, with respect to a jitter frequency of 1 Hz, the jitter indication can be accomplished with a magnification of 10 times. The monostable multivibrator 46, forms a signal, as indicated in FIG. 3(E). This signal falls in accordance with the fall of the signal from the monostable multivibrator 33 and rises after a specific time. This rise is modulated in response to the jitter detected by the jitter detecting circuit 34. This output signal is supplied to a differentiation circuit 47, where its rise is differentiated. A pulse signal is obtained as indiated in FIG. 3(F) and supplied to mixer 30, as a jitter indicating line signal Sj. The position of the jitter indicating line 19 on the picture screen is determined by the time interval between the fall and the rise of the signal of the monostable multivibrator 46. Accordingly, this time interval is so selected that the jitter indicating line 19 will be in an easily observable position on the picture screen.

On one hand, the monostable multivibrator 41 produces an output signal which, is indicated in FI. 3(G). The output signal from multivibrator 41 falls in response to the fall of the signal from the monostble multivibrator 33 and rises after a specific time. This output signal is supplied to a differentiation circuit 43 where it is formed into a signal $Sr_1$ as indicated in FIG. 3(H). That formed signal $Sr_1$ is supplied as a first reference line signal $Sr_1$ through a mixer 45 to the mixer 30. The output of the monostable multivibrator 41 is also supplied to a monostable multivibrator 42, which produces an output signal, as indicated in FIG. 3(I). This output signal falls in response to the rise of reference line signal $Sr_1$ and rises after a specific time. This output signal of the monostable multivibrator 42 is formed into a signal as indicated in FIG. 3(J) by a differentiation circuit 44 and is supplied through the mixer 45 to the mixer 30 as a second reference line signal $Sr_2$.

The time interval between the fall and the rise in the output of the monostable multivibrator 41 is selected to be a value which is less than the time interval between the fall and the rise of the monostable multivibrator 46, when the output of the multivibrator 41 is not being modulated by the jitter detection signal from the jitter detecting circuit 34. The time interval of the monostable multivbrator 41 is adjusted by a variable resistor 48. Furthermore, the time interval from the fall to the rise of the monostable multivibrator 42 determines the display spacing between the reference lines 20 and 21 and is selected in accordance with the allowable jitter quantity, for example. This time interval of the monostable multivibrator 42 is adjusted by means of a variable resistor 49.

A signal is obtained from the mixer 30 as indicated in FIG. 3(K). This signal results from the superimposition on the reproduced video signal of the jitter indicating line signal Sj and the first and second reference line signals $Sr_1$ and $Sr_2$. This output signal is supplied through the output terminal 16 to the television receiver 17. On the picture screen of the television receiver 17, the jitter indicating line 19 is displayed by the jitter indicating line signal Sj. The reference lines 20 and 21 are displayed by the reference line signals $Sr_1$ and $Sr_2$ superimposed on the reproduced picture image produced by the reproduced video signal. In the present embodiment of the invention, the polarities of the jitter indicating line signal Sj and the reference line signals $Sr_1$ and $Sr_2$ are selected to be on the white side. The jitter indicating line 19 and the reference lines 20 and 21 are represented by white lines.

Next, the freqeuncy charactersitic correction circuit 39 will be described. In general, commercial television receivers have AFC characteristics as indicated by curves I$a$ through I$e$, for example, in FIG. 4, depending on the manufacturer, type, and other factors. The abscissa of FIG. 4 represents the sway frequency (Hz), while the ordinate represents the rate (percent) of the sway. In the ordinate, the numeral "1", for example, signifies that the width or amplitude of the sway on the picture screen becomes 1 percent of one horizontal scanning line length if there is a frequency fluctuation of 1 percent from peak to peak in the input signal. As is apparent from these curves, when the frequency fluctuation of the input signal is less than 10 Hz, the sway on the picture screen is substantially constant. The sway is great from 10 to 500 Hz, but it becomes small at frequencies above 500 Hz.

If the magnitude in sway of the jitter indicating line 19 is the same as the magnitude of sway of the reproduced image, the sway, in general, would be small, and difficult to detect. For this reason, in the present embodiment of the invention, only the magnitude of the sway of the jitter indicating line 19 is magnified 10 times by means of the amplifier 40. Accordingly, the frequency characteristic correction circuit 39 is connected between the PLL 50 and the amplifier 40 so that the magnified jitter indicating line 19 will also have a characteristic magnified in the same manner.

The visual characteristic with respect to the sway on the picture screen is indicated in FIG. 5, where a curve indicates a limit of detection. As is apparent from this characteristic, the sway rate of detection limit becomes greater as the sway frequency becomes lower. It is more difficult to detect a lower sway frequency, even if there is some sway which can be permitted.

The frequency characteristic correction circuit 39 has a weighting curve characteristic, as indicated by curve II in FIG. 4. At frequencies above 1 Hz, for example, it has a characteristic which is an average value of the AFC characteristics of the various television receivers. At frequencies below 1 Hz, it has a characteristic which decreases according to the visual characteristic.

The freqeuncy characteristic correction circuit 39 comprises resistors R1, R2, and R3 and a capacitor C1 which are connected, for example, as indicated in FIG. 6. This frequency characteristic correction circuit 39 is of a character such that, in combination with the PLL circuit 50 and the amplifier 40, as a whole, it affords the characteristic of the curve II in FIG. 4. Its characteristic is determined with consideration for the characteristics of these circuits.

In the inspection of the video signal recording and reproducing apparatus, it is ordinarily not necessary to read the absolute value of each and every jitter quantity. The only requirement is to determine whether or not the jitter is below a specific quantity. In this case, by adjusting the variable resistor 49, the space between the reference lines 20 and 21 is set in accordance with the limiting values of the allowable jitter quantity. The jitter can then be judged to pass inspection. By adjusting the variable resistor 48, the positions of the reference lines 20 and 21 are set relative to the jitter indicating line 19 so that the center of the sway of the jitter indicating line 19 is positioned centrally between the reference lines 20 and 21. When these adjustments have been made, it is easy for the inspection of the video signal recording and reproducing apparatus 10 to pass or fail. The jitter inspection can be judged very easily by merely determining whether the jitter indicating line 19 is continually within the refernece lines 20 and 21 or whether it deviates outside of these lines.

If the absolute value of the jitter quantity is measured, the variable resistors 48 and 49 are adjusted so that the reference lines 20 and 21 coincide with peaks of the sway of the jitter indicating line 19, as illustrated in FIG. 7A. Then, the operator observes and reads the space or width W1 between the reference lines 20 and 21. A value pf 1/10 W1 corresponds to the actual value of the jitter converted into a length in the horizontal direction of a scanning line on the picture screen. In actual practice, instead of directly measuring the space between the reference lines 20 and 21 on the picture screen, it is desirable that the variable resistors 48 and 49 have knobs with scales corresponding to positions of the reference lines on the picture screen. The operator recognizes the space between the reference lines by reading the scales.

If it is troublesome to change the space between the reference lines, the measuring and inspecting operator may adjust only the variable resistor 48, while the variable resistor 49 remains unchanged. The reference line 20 coincides with the left side peak of the jitter indicating line 19 as illustrated in FIG. 7B. Then, the operator may observe and read the space W2 between the reference line 20 and the right side peak of the jitter indicating line 19 on the picture screen.

As another embodiment of the jitter measuring apparatus of the invention, the jitter detecting circuit 34 of FIG. 2 may be a circuit such as shown in FIG. 8. In FIG. 8, parts which are the same as corresponding parts in FIG. 2 are designated by like reference numerals and will not be described in detail again.

The output signal of the frequency characteristic correction circuit 39 is supplied directly to a contact a of a switch 60, to a contact b of the switch 60 through a low-pass filter 61, and to a contact c of the switch 60 through a high-pass filter 62. If the movable contact of the switch 60 is on the contact a, the circuit and operation of the jitter detecting circuit are the same as those of the embodiment in FIG. 2. If the movable contact of the switch 60 is on the contact b or c, only a low frequency component or high frequency component among the detected jitter components is supplied to the amplifier 40, from either the low-pass filter 61 or highpass filter 62. Accordingly, in this case, only the low frequency component or high frequency component of the jitter component is selectively indicated or displayed on the picture screen.

The signal applied to the input terminal 15 is not limited to the reproduced video signal but may be another signal in which the jitter is to be measured. In the jitter detecting circuit 34, another frequency discriminator may be employed instead of the PLL circuit 50. Furthermore, the magnification degree of the jitter resulting from the amplification of the amplifier 40 is not restricted to 10 times. It is most desirable to select the magnification degree at 10 times in actual practice.

Further, this invention is not limited to these embodiments. Variations and modifications may be made without departing from the scope and spirit of the invention.

What is claimed is:

1. An apparatus for measuring jitter of a television receiver, said apparatus comprising:
    means for detecting a jitter component in an input signal which includes the jitter component;
    means for generating a vertically extending and horizontally swaying jitter indicating line signal in response to the detected jitter component, means for supplying said jitter indicating line signal to the television receiver which displays said jitter indicating line as a vertically extending and horizontally swaying picture on the screen of the television receiver; and
    means for generating at least one reference line signal at a time point which is deviated from the jitter indicating line signal, means for supplying said reference line signal to the television receiver which displays said reference line at a vertically extending reference position relative to the jitter indicating line appearing on the picture screen.

2. An apparatus for measuring jitter of a television receiver, said apparatus comprising:
    means for separating a horizontal synchronizing signal from an input video signal including a jitter component;
    means for detecting the jitter component from the separated horizontal synchronizing signal;
    means for amplifying the detected jitter component;
    means for generating a vertically extending and horizontally swaying jitter indicating line signal in response to the amplified jitter component, means for supplying said jitter indicating line signal to the television receiver which displays said jitter indicating line as a vertically extending and horizontally swaying picture on the screen of the television receiver; and
    means for generating a pair of reference line signals at time points having a predetermined time interval therebetween, said time points being deviated away from the jitter indicating line signal, means for supplying said reference line signals to the television receiver which displays said reference lines at vertically extending reference positions relative to the jitter indicating line on the picture screen.

3. An apparatus for measuring jitter as claimed in claim 2 which further comprises a frequency characteristic correcting means coupled between the detecting means and the amplifying means, said correcting means having a weighting curve characteristic which closely resembles an AFC characteristic of the measured television receiver in relation to a sway rate versus a sway frequency of jitter.

4. An apparatus for measuring jitter as claimed in claim 2 in which said amplifying means has a gain such that the jitter indicating line is displayed to indicate the jitter in a magnitude which is magnified by 10 times on the picture screen.

5. An apparatus for measuring jitter as claimed in claim 2 in which said jitter indicating line signal generating means comprises means, responsive to the separated horizontal synchronizing signal, for producing a rectangular wave signal having one edge which is modulated by the detected jitter component, and means for differentiating the modulated edge of the produced signal.

6. An apparatus for measuring jitter as claimed in claim 2 which further comprises means for adjusting the time interval between the pair of reference line signals.

7. An apparatus for measuring jitter as claimed in claim 2 in which the reference line signal generating means comprises a first delay means for producing a signal by delaying the separated horizontal synchronizing signal for a specific time interval, means for producing a first reference line signal by differentiating the output signal of the first delay means, a second delay means for producing a signal by delaying the output signal of the first delay means for a second specific time interval, and means for producing a second reference line signal by differentiating the output signal of the second delay means.

8. An apparatus for measuring jitter as claimed in claim 7 in which said first and second delay means respectively have means for adjusting the delay intervals for producing the delayed signals.

* * * * *